July 4, 1967   E. C. ADAMS ET AL   3,329,953

DOPPLER TARGET SIMULATOR

Filed June 15, 1966

INVENTORS
EDWIN C. ADAMS
LEWIS MICHNIK
ROBERT D. WITULSKI

BY *Alexander & Dowell*

ATTORNEYS

United States Patent Office 3,329,953
Patented July 4, 1967

3,329,953
DOPPLER TARGET SIMULATOR
Edwin C. Adams, Clarence, Lewis Michnik, Buffalo, and Robert D. Witulski, Cheektowaga, N.Y., assignors to Sierra Research Corporation, a corporation of New York
Filed June 15, 1966, Ser. No. 557,705
8 Claims. (Cl. 343—17.7)

This invention relates to radar target simulators, and more particularly relates to improved target means for simulating the Doppler effect caused by a target moving with respect to the radar being tested.

There are a number of prior art devices intended to provide generally similar target effects at radar frequencies by providing a continuous advancement or retardation of the relative phase between the incoming signal from the radar to the target simulator and the outgoing signal from the targe simulator to the radar. The direction of phase shift determines whether the target appears to be approaching the radar or retreating therefrom, and in some prior art patents the phase shift is controlled by a locally-generated sawtooth wave whose repetition rate determines the apparent rate of approach or retreat of the simulated target with respect to the radar system under test. Prior art simulators also include antenna means for receiving and transmitting the radar signals, some of which are connected to multiple-port circulator means, for instance as shown in Steinberger 3,138,797, Hubka 3,090,955, or Heyser 3,103,010. It is to this general type of Doppler test device that the present invention is directed.

The present invention can be considered as an extension of the teaching in Patent 3,108,275 to Chisholm which teaches the idea of providing a passive reflector horn to which signals are transmitted from a radar, modified by suitable means, and emitted again toward the radar from the same horn in modified condition. It is an important object of the present invention to provide an improved Doppler target simulator which employs the same horn, or antenna means, both for receiving and then for emitting the radar signal in the same general direction in space from which it was received, and which employs a circulator to reverse the flow of energy in the simulator. The circulator provides a better impedance match to the horn than the previously employed short-circuited waveguide.

It is another principal object of the present invention to provide a Doppler target simulator in which no mixing or modulating of the received radar signal takes place during modification thereof so that no side bands whatever are created. The present invention seeks to entirely avoid the creation of of side bands in view of the fact that such side bands can never really be full suppressed, and in view of the fact that the two side bands respectively represent approaching and retreating targets whereby, to the extent that both side bands are present, their presence creates ambiguous target simulations.

Another major object of the present invention is to provide an improved simulator wherein the signal path for the radar frequency energy is solid-state and can comprise purely passive path elements.

Still another important object of the invention is to provide a simulator employing a solid-state bidirectional phase shifter, and to place the phase shifter in the circuit adjacent to the horn or antenna means in such a location that the radar energy passes through the phase shifter twice, once just after coming into the horn and the second time just prior to departing from the horn, so that the energy is phase-shifted twice by the bidirectional shifter. One important advantage of this improved selection of the nature and placement of the phase shifter is that, since solid-state phase shifters become less linear as the degree of phase shift is increased for each transit therethrough, the ability to pass the signal twice through the same bidirectional phase shifter makes it possible to employ only half as much phase shift during each passage of the signal therethrough, thereby operating the phase shifter on a more linear portion of its curve at all times to preserve to a greater extent the waveform of the signal passing through the phase shifter.

Another important object of the invention is to provide a system employing a circulator as the device which reverses the direction of travel of the input signal and causes it to re-radiate out through the same horn, such circulator being additionally advantageous since it provides an easy way to introduce gain into the microwave signal path in the event that a higher output level is desired from the target simulator than the output level which can be obtained by passive means. According to the present invention a multiple-port circulator is used in which the signal both enters and leaves the circulator by the same port, and in which the other ports are short-circuited by quarter-wave reflecting plungers so as to reflect the signal back into the circulator at each of the other ports until it returns to the port by which it entered and by which it is intended to leave the circulator. In the the event that a three-port circulator is used, two of the ports would ordinarily be short-circuited to provide passive reflective characteristics, but if gain is desired in the system, the short-circuits would be removed from these two successive ports and a microwave amplifier connected to receive the signals from the first of the successive ports and deliver it into the second of the successive ports at increased amplitude.

Still another object of this invention is to provide a Doppler simulator of the type described above, but wherein the simulator itself is improved by being simplified. One of the principal areas of improvement by simplification involves the above-mentioned selection and placement of a solid-state bidirectional phase shifter at a location in the microwave path at which the microwave energy passes twice through the phase shifter and is shifted both times in the same direction.

Other objects and advantages of the invention will become apparent during the following discussion of the drawings, wherein.

Figure 1:
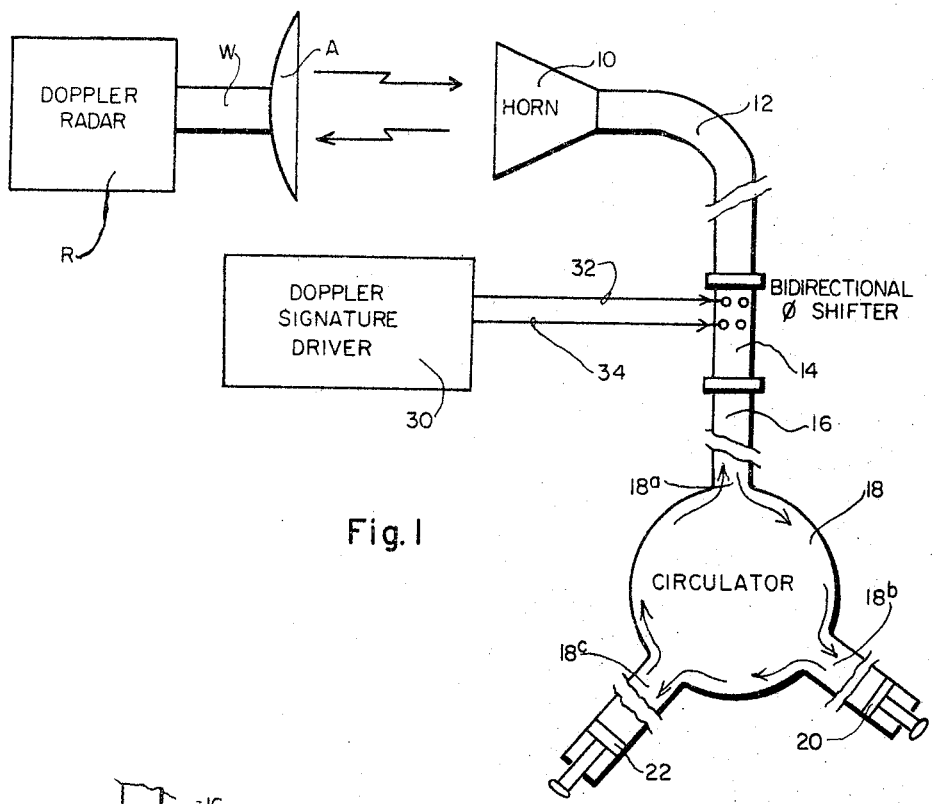
FIG. 1 is a block diagram showing a passive Doppler target simulator according to the present invention in operative relationship with a Doppler radar.

Referring now to the drawing, the diagram of FIG. 1 shows a conventional Doppler radar R connected by a waveguide W to a radiating antenna A. The antenna A is so oriented as to direct energy to an antenna horn 10 which comprises both the input and the output of the Droppler target simulator. The horn 10 is connected by suitable transmission line means in the form of a waveguide 12 to a phase shifter 14 in the form of a special section of waveguide coupled between the waveguide section 12 and a waveguide section 16 which is connected to a conventional multiple-port circulator 18. The circulator illustrated in this embodiment has three ports labeled 18a, 18b and 18c, and is of conventional design and operation, meaning that energy introduced at any port circulates in one direction, for instance clockwise, and exists at the next port.

In FIG. 1 the ports 18b and 18c are respectively provided with short-circuiting plungers 20 and 22 which are longitudinally reciprocable within waveguides connected to the ports 18b and 18c. The plungers 20 and 22 are both adjustable to a quarter-wave position for the purpose of causing complete reflection of the energy in the waveguide back into the same port of the circulator as shown by the arrows in FIG. 1.

Figure 2:
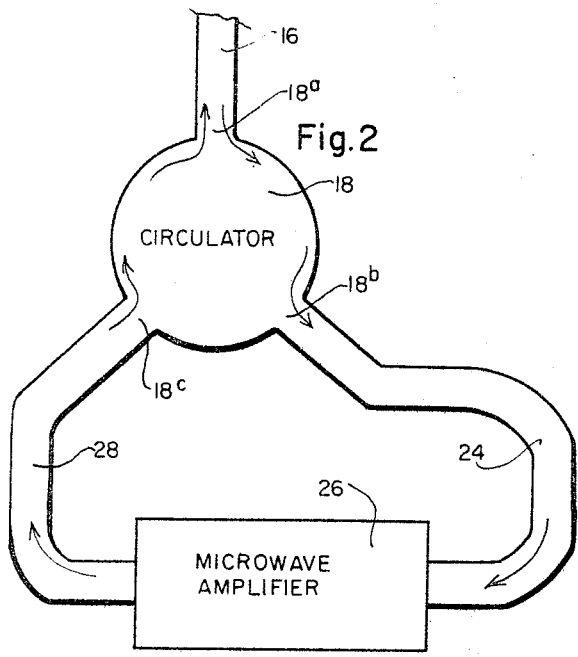
FIG. 2 is a partial view similar to FIG. 1 and including the circulator portion of the diagram, but including a microwave amplifier serving the purpose of providing the target simulator with gain.
Figure 3:
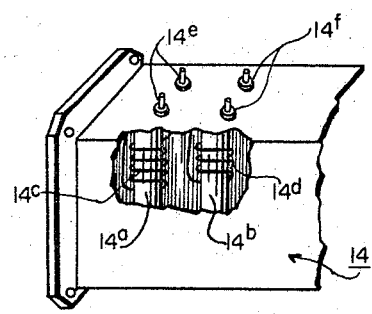
FIG. 3 is a partial perspective view of a typical solid-state phase shifter suitable for the present simulator.

FIG. 2 shows a similar circulator bearing the same reference numerals, and intended to represent the same circulator structure in the same organization as shown in FIG. 1. However, in FIG. 2 there are no reflecting plungers 20 or 22, but rather the energy leaving the port 18b travels through the wave guide 24 to a microwave amplifier 26 where it is amplified and delivered at higher amplitude into the port 18c through the waveguide 28. In both FIG. 1 or FIG. 2 energy leaving port 18c circulates to the port 18a and leaves the circulator through this port and through the waveguides 16 and 12, also passing throught he bidirectional phase shifter 14 for the second time. The energy is then re-radiated in the direction of the radar antenna A by the same horn 10.

The actual working embodiment of the present invention employs a phase shifter 14 which comprises a length of waveguide having plural ferrite elements 14a and 14b disposed therein and each wound with windings 14c and 14d so that control currents applied to the windings determine the degree of phase shift introduced by the phase shifter whenever energy passes therethrough in either direction. The phase shifter actually used is a commercially available product manufactured by Rantec Corporation and bearing their Model No. PX–212. There are pairs of terminals 14e and 14f on the waveguide for receiving bias current and/or Doppler signature currents from a drive generator 30, FIG. 1. The leads 32 and 34 serve to schematically illustrate the application of control currents to the phase shifter. One of the most typical and simplest signature currents takes the form of a sawtooth whose effect for phase shifting is well-known in the prior art, thus making it unnecessary to go into detail. The operation of this phase shifter 14 is bidirectional, meaning that the same type of phase shift, either advancing or retarding, is applied to microwave radiation passing through the phase shifter 14 regardless of the direction in which the energy travels. Therefore all energy received in the horn 10 passes through the phase shifter 14 twice, once when travelling toward the circulator and a second time when travelling away from the circulator back toward the horn. The manufacturer of the above-specified phase shifter employed in the working embodiment has issued characteristic-curve data showing phase shifts up to 450 degrees depending on the amount of current which is passed through the windings around the ferrite strips. The degree of phase shift is fairly linear in the range of 9 to 9.6 kmc. for control currents up to about .4 ampere, which control current provides phase shifts between 200 and 275 degrees, depending upon the frequency of the energy within the above range.

Operation of the phase shifter is virtually linear for current values below .4 ampere, and it is therefore very convenient to provide 180-degree phase shifts by adjusting the output current of a sawtooth driver 30 to the necessary value, for instance about .38 ampere for 9 kmc. microwave input. By setting the phase shift equal to 180 degrees for a single passage of energy through the phase shifter in one direction, an over-all 360-degree phase shift will result for any signal entering the horn 10 as compared with the signal when it is re-radiated by the horn 10 after passing twice through the phase shifter 14. One of the advantages of the present invention is that the phase shifter can be adjusted to provide only half of the desired phase shift per transit therethrough, and therefore the phase shifter can be operated in a more linear portion of its range.

In view of the description in Heyser 3,103,010 of the use of sawtooth currents to simulate continuous phase shift of a Doppler signal created by a target which is either advancing toward or retreating away from the radar, it is deemed unnecessary to describe this function in any further detail. If the sawtooth has a rising characteristic the Doppler effect will be in one direction, but if the sawtooth falls with time the Doppler effect will appear to take place in the reverse direction. The peak-to peak amplitude of the sawtooth current determines the degree of phase shift, and can be set to provide values other than a total of 360 degrees, for instance 720 degrees. The frequency of the sawtooth drive can be varied in order to make the simulated Doppler signal appear to change its velocity of approach or recession. The higher the frequency of the sawtooth drive 30 the higher will be the velocity of the simulated Doppler target.

The present invention is not to be limited to the exact forms shown in the drawings for obviously changes may be made therein within the scope of the following claims.

We claim:
1. A Doppler radar target simulator for receiving energy from a radar and re-emitting part thereof toward the radar, comprising:
 (a) antenna means;
 (b) transmission line means coupled at one end to the antenna means;
 (c) a multiple-port circulator coupled at a first port to the other end of the transmission line means and including means coupled to the other ports for directing the energy received at the first port to be emitted again through the first port into the transmission line means;
 (d) solid-state phase shift means in the transmission line means between the antenna means and the circulator so that the energy passes through the shift means twice, the latter means having bidirectional shift characteristics whereby energy passing in either direction is shifted approximately to the same degree and in the same direction with respect to time; and
 (e) means connected to the shift means and controlling the latter to vary the phase of the energy emitted from the antenna means with respect to the phase of the energy received thereat to produce simulated Doppler effects.

2. In a simulator as set forth in claim 1, said directing means at said other circulator ports comprising sections of transmission line connected to the ports and having short-circuiting means positioned to reflect the energy leaving each of said other ports back into the circulator.

3. In a simulator as set forth in claim 1, said circulator means having at least two of said other ports; and energy amplifying means connected to receive energy from one of said other ports and deliver amplified energy correspondingly therewith to another thereof.

4. In a simulator as set forth in claim 1, said transmission line means comprising a waveguide, and said phase shift means comprising ferrite elements contained within the waveguide between the antenna means and the circulator.

5. In a simulator as set forth in claim 4, means for adjusting the degree of phase shift comprising electrical winding means on the ferrite elements.

6. In a simulator as set forth in claim 5, said controlling means comprising Doppler signature generator means for generating current varying with time to simulate a Doppler effect, and said generator means being coupled to pass said current through said winding means.

7. In a simulator as set forth in claim 6, a certain current amplitude being required in the winding means to produce a 360-degree phase shift in energy passing twice through said shift means, and said generator means comprising means for generating sawtooth currents having half of said certain amplitude.

8. In a Doppler target simulator including antenna means for receiving energy from a radar and re-emitting some of said energy toward the radar and including a waveguide connecting said antenna means to means for reversing the direction of propagation of the energy in the waveguide, the improvement comprising phase shifting means inserted in the waveguide adjacent the antenna means and having bidirectional phase shift characteristics, whereby energy passing through the phase shifting means is shifted to approximately the same degree and in the same direction both times it passes therethrough.

No references cited.

RODNEY D. BENNETT, *Primary Examiner.*

T. H. TUBBESING, *Assistant Examiner.*